(12) United States Patent
Ebner

(10) Patent No.: US 8,364,292 B2
(45) Date of Patent: Jan. 29, 2013

(54) METHOD FOR ISOLATING A PLANT DEVICE OF AN INDUSTRIAL PLANT

(75) Inventor: Günther Ebner, Gerhardshofen (DE)

(73) Assignee: Siemens Aktiengesellschaft, München (DE)

( * ) Notice: Subject to any disclaimer, the term of this patent is extended or adjusted under 35 U.S.C. 154(b) by 394 days.

(21) Appl. No.: 12/712,561

(22) Filed: Feb. 25, 2010

(65) Prior Publication Data

US 2010/0217409 A1  Aug. 26, 2010

(30) Foreign Application Priority Data

Feb. 25, 2009  (DE) .................. 10 2009 010 534

(51) Int. Cl.
*G05B 9/02* (2006.01)
(52) U.S. Cl. .................................. 700/82; 702/184
(58) Field of Classification Search ............. 700/82; 702/184
See application file for complete search history.

(56) References Cited

U.S. PATENT DOCUMENTS

| | | | | |
|---|---|---|---|---|
| 3,636,331 A * | 1/1972 | Amrehn | ........................ | 700/82 |
| 6,314,385 B1 * | 11/2001 | Kim et al. | ..................... | 702/184 |
| 6,385,497 B1 * | 5/2002 | Ogushi et al. | ................. | 700/110 |
| 6,766,210 B2 * | 7/2004 | Jun et al. | ....................... | 700/110 |
| 2004/0093102 A1 * | 5/2004 | Liiri et al. | ....................... | 700/96 |
| 2009/0030950 A1 | 1/2009 | Maneval et al. | | |

FOREIGN PATENT DOCUMENTS

| | | |
|---|---|---|
| DE | 202006019810 U1 | 5/2007 |
| DE | 102005060049 A1 | 6/2007 |
| EP | 1657610 A2 | 5/2006 |
| EP | 2019347 A1 | 1/2009 |
| WO | 0231717 A1 | 4/2002 |

* cited by examiner

*Primary Examiner* — Sean Shechtman

(57) ABSTRACT

A method for isolating a plant device of an industrial plant, wherein at least one safety measure is implemented on the plant device in order for work to be done safely on the plant device is provided. Isolation information is communicated to a control and protection system using a data communication unit having a data input that receives data from the plant device. An interface between the data communication unit and a control and protection system of the industrial plant is used to transmit the isolation information from the data communication unit to the control and protection unit. A device for isolating a plant device of an industrial plant to carry out work on the plant device is also provided.

18 Claims, 1 Drawing Sheet

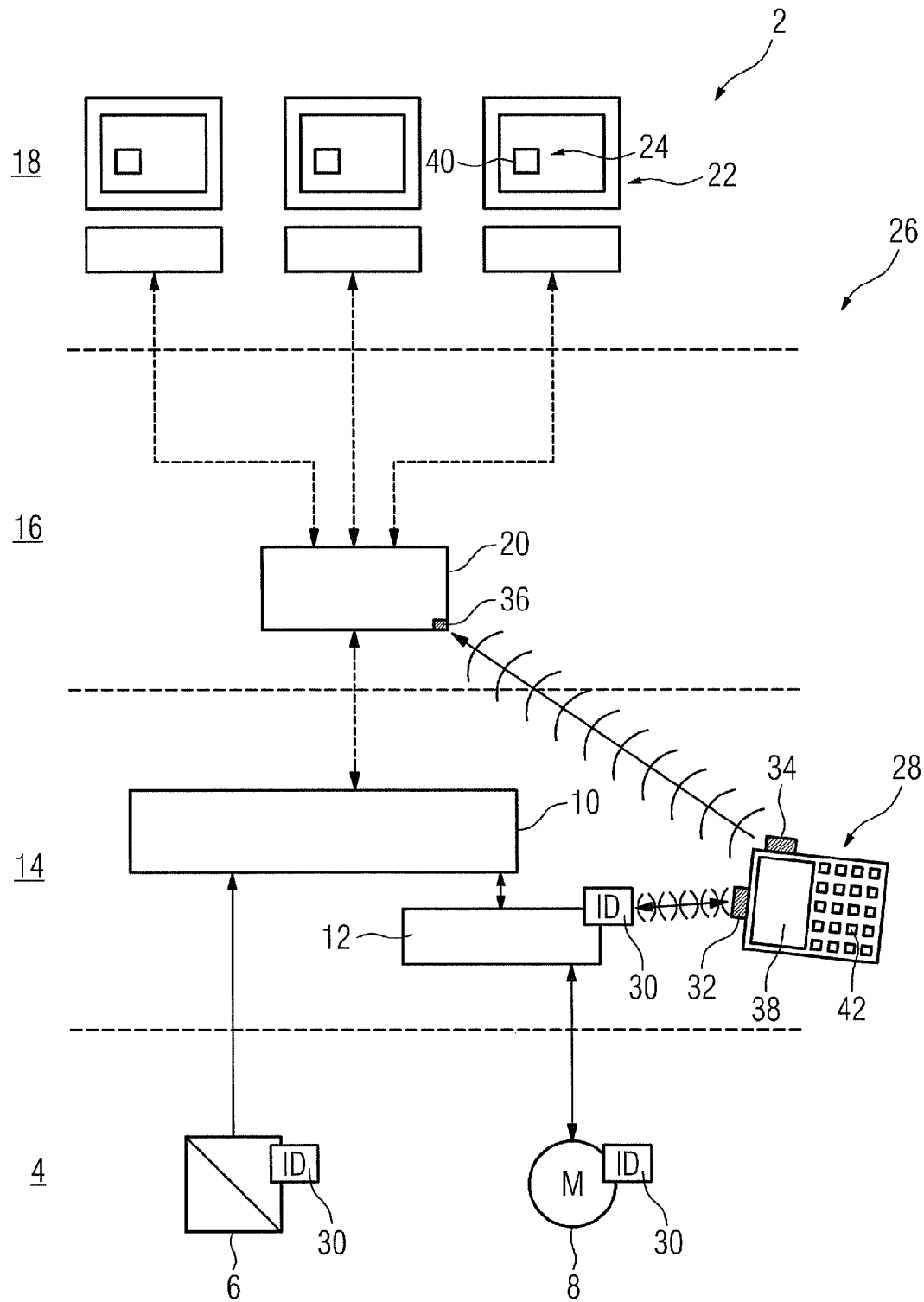

METHOD FOR ISOLATING A PLANT DEVICE OF AN INDUSTRIAL PLANT

CROSS REFERENCE TO RELATED APPLICATIONS

This application claims priority of German application No. 10 2009 010534.4 DE filed Feb. 25, 2009, which is incorporated by reference herein in its entirety.

FIELD OF INVENTION

The invention relates to a method for isolating a plant device of an industrial plant, wherein at least one safety measure is implemented on the plant device, so it is possible to work safely on the plant device, and the plant device is isolated for the work to be carried out.

BACKGROUND OF INVENTION

In an automated industrial plant, such as a production line, a petrochemical plant, a power plant or conveying plant, an industrial process is carried out with the aid of a large number of plant devices. If one of these plant devices is to be repaired or maintained then it must be ensured that the plant device is not automatically and undesirably put into operation, loaded with media or connected to a power grid during the work. Catalogs of measures which list safety measures that are to be carried out before the start of the actual work on the plant device exist to ensure occupational safety. These safety measures are conventionally carried out by an industrial plant employee and the plant device is then isolated for the work to be carried out.

This isolation can take place in that the catalog of measures is ticked off measure for measure on a form, an industrial plant employee signs the form and a copy of the form is given to the maintenance engineer as confirmation of isolation. Once work on the plant device is concluded, the isolation is cancelled in that the maintenance engineer gives the industrial plant employee the confirmation of isolation again and he then reverses the safety measures. Only then is the plant device put back into operation.

SUMMARY OF INVENTION

It is an object of the present invention to disclose a method for isolating a plant device of an industrial plant with which a high level of safety may be achieved when working on the plant device.

This object is achieved by a method of the type mentioned in the introduction in which, according to the invention, isolation information is communicated to the control and protection system using a data communication unit having a data input for receiving data from the plant device and an interface between the data communication unit and a control and protection system of the industrial plant.

The invention proceeds in this case from the consideration that a plant device switched off during the course of isolation measures is displayed as being switched off in an industrial plant control room, so it may be seen there that the plant device is idle. As the safety measures are usually carried out manually, however, for example closing of a shutoff valve, throwing of an electric switch or manual locking of moving parts, the control and protection system frequently does not know why the plant device is idle.

If an operator in the control room does not have a copy of the isolation form or equivalent information at his disposal then he cannot decide whether switching-off of the plant device has taken place as a result of a fault, for example overloading, or a manual intended, operational switching-off. The operator will possibly attempt to put the plant device back into operation using appropriate process control steps, and this can endanger the person carrying out the work on the device plant.

By communicating the isolation information to the control and protection system, switching-off of the plant device can be identified as being intentional, so no attempts to re-operate the plant device are made as long as isolation exists. Furthermore, passive drives, such as a manual gate valve, or other components, whose state is not monitored by the control and protection system, may also be detected and displayed in their isolated state, so the cause of error messages potentially induced by switching-off of these components can be identified and manual or semi-automatic countermeasures are omitted.

The industrial plant can be any industrial plant with automatic control of a plant device. Isolation of the plant device can include a release statement to the effect that the plant device may be worked on. It can be made orally, in writing or electronically. The work is usually non-operational work, such as replacement of the plant device, of parts thereof, or maintenance, adjustment or repair work.

Isolating advantageously takes place manually and can include a number of isolation or safety measures that are expediently carried out by a learned person from the industrial plant. The plant device can be worked on following isolation.

The data communication unit is advantageously an electronic device for transmitting, and, expediently, buffering, data which has entered the data communication unit via the data input, to the interface. The data input can be provided for identification of the plant device and is advantageously constructed as a reading unit for independent reading-in of data, for example for reading a barcode or another identification means of the plant device. The data input can, however, also be a unit for manual inputting, for example a keyboard or a screen input.

The interface is a data interface and is used for at least monodirectional exchange of data between the data communication unit and the control and protection system of the industrial plant and, in particular, for establishing an appropriate connection in terms of signaling. The control and protection system includes devices and programs for controlling the industrial plant and its plant devices. The invention can be applied particularly advantageously to all plant devices that are switched off, in particular manually, and should not be switched on again until isolation has been cancelled.

In an advantageous embodiment of the invention the data communication unit is a portable unit which is brought to the plant device by an operator to receive data from the plant device that is to be worked on. The isolation information can in this way be directly input on site and communicated via the interface to the control and protection system without, for example, notes having to be brought from the plant device to an input station.

The plant device is advantageously provided with a storage medium comprising data, which is read-in by the data communication unit. The storage medium can be a passive storage medium, for example a passive identification carrier, such as a barcode or an RFID (Radio Frequency Identification Device). The data is expediently identification data relating to the plant device.

The isolation information is also advantageously wirelessly transmitted to the control and protection system, whereby quick and efficient transmission may be achieved. Transmission can take place immediately after reading in the data or in response to an operator input into the data communication unit.

The isolation information expediently includes identification data for identifying the plant device. The control and protection system can thus identify the plant device, which is to be worked on, and mark it accordingly in operator schedules. It is also advantageous if it contains information on the switching-off process that has been undertaken, for example whether a power supply has been switched off, i.e. a power supply to the plant device, a media conduit has been closed or moving parts have been blocked. Error messages from the control and protection system that potentially occur as a result can thus be quickly understood and attributed.

In a further variant the isolation information can include data relating to work to be carried out on the isolated plant device. This data can be data relating to the type of work, the envisaged duration and/or consequences of the work. It is likewise possible for the data to include information which allows the control and protection system to access stored information relating to the work, for example relating to a work package that includes several operations on a plurality of plant devices. Isolation can thus be sorted in a larger context, resulting in a good overview of the work carried out in the industrial plant.

It is also proposed that the control and protection system blocks activating triggering of the isolated plant device induced by the control and protection device. This means that the situation where the plant device is put back into operation unintentionally as a result of automated procedures is reliably avoided. The plant device can be reliably switched off and safety while working can be increased.

Activating triggering is expediently also blocked if the isolated plant device is supplied with working energy and is switched on. Thus, for example, the plant device can be put back into operation by a maintenance engineer for the purpose of testing work that has been carried out. By way of example a pump can be switched on without additional procedures that are associated with the plant device, for example supplying the pump with liquid, having to be carried out. Consequently the situation where a plant device, which has been identified by the control and protection system as actually being operational, is put back into full operation without isolation having been cancelled can be avoided.

To show the isolated plant device in, for example, a control room it is advantageous if the control and protection system identifies the isolated plant device as such on a display. This identification means an operator can unmistakably and clearly recognize that the plant device is isolated and therefore intentionally idle. Display can take place immediately after receiving the information from the data communication unit.

It is advantageous in particular for a possible retracing of faults if the control and protection system logs isolations of plant devices. It may thus be logged which plant device has been isolated by which data communication unit and at what time and, for example, when the isolation was cancelled again.

The level of safety at which work can be carried out on the plant device can be increased further if the control and protection system carries out a plausibility test relating to the isolated plant device. This test can include a test to determine whether information, other than the isolation information, exists for the plant device, which information is compatible with an isolation. As a rule switching-off of the plant device is also detected and displayed without the isolation information from the control and protection system. The isolation information can accordingly be compared with the additional information, it being determined, for example, that the isolated plant device is already switched off. The plausibility test is therefore successful.

However it may be that the plant device is accidentally switched on during the work to be carried out and this change in status exists in the form of additional information in the control and protection system. The plausibility test is negative in such a case. In the event of a negative test result the control and protection system advantageously emits a warning, for example on a display in the control room, so start-up of the plant device is prevented, for example, or on the data communication unit. The person carrying out maintenance can identify that the plant device has undergone a change in status for example and can react accordingly.

It is also advantageous if the control and protection system sends a confirmation of isolation to the data communication unit. A person implementing the isolation can thus be absolutely certain that the isolation information, transmitted for example via radio, has actually reached the control center.

In a further advantageous variant of the invention the control and protection system determines data relating to the isolated plant device and sends this to the data communication unit. Status data, such as pressure, temperature, flow rate, speed or the like, which may be relevant to safety can thus be communicated to the person implementing isolation. By way of example the situation where a very hot unit is opened immediately after isolation can be avoided. The data relating to the isolated plant device can be sent unrequested following receipt of the isolation information, or when requested by the data communication unit.

It is also advantageous if the plant device is put back into operation and the control and protection system identifies data relating to the plant device put into operation and sends this to the data communication unit, in particular at the request of the data communication unit. The plant device can be started up particularly efficiently in this way as the operational data can be communicated to a person implementing the start-up and this person can check whether start-up is taking place properly, whether, for example, a planned pressure build-up, a temperature increase or a speed characteristic is taking place.

In a further advantageous embodiment of the invention it is provided that the control and protection system determines consequences of isolation within the industrial plant and sends data relating to consequences to the data communication unit. An operator can thus discern which consequences isolation has in the industrial plant and whether maintenance work ought not to perhaps be undertaken at a later time or on a different plant device to begin with.

Cancellation of the isolation is advantageously communicated to the control and protection system via the data communication unit. This can acknowledge the corresponding change in status of the plant device and assume automatic control of the plant device again, so the plant device is put back into regular operation.

The invention is also geared toward a device for isolating a plant device of an industrial plant to carry out work on the plant device.

According to the invention the device comprises a data communication unit having a data input for identifying the plant device and an interface for connecting the data communication unit in terms of signaling to a control and protection system of the industrial plant to transmit isolation information from the data communication unit to the control and protection system. Isolation can be displayed to the control and protection system and work can be carried out on the plant device at a high level of safety.

BRIEF DESCRIPTION OF THE DRAWINGS

The invention will be described in more detail with reference to an exemplary embodiment which is illustrated in the drawing.

DETAILED DESCRIPTION OF INVENTION

The drawing incorporates a single figure in which an industrial plant 2 is schematically indicated. In a section 4 on site the industrial plant 2 comprises a number of plant devices 6, 8, of which only a sensor as plant device 6 and a drive as plant device 8 are shown for the sake of clarity. The sensor is directly connected to an automation system 10 and the drive is connected via switching station 12 to the automation system 10 in an electronic compartment 14. The automation system reads the sensor 10 and controls the drive via the switching station 12.

In a server room 16 in a control room 18 a server 20 is used as an interface between an operator level, in this exemplary embodiment a number of operator stations 22 in the control room 18, and a control level, in this example the automation system 10. Operators can monitor and control the industrial plant 2 using displays 24 pertaining to the operator stations 22. The control room 18, the server 20, the automation system 10 and the switching station 12 combined form a control and protection system 26 with which the industrial plant 2, and in particular its section 4, is monitored and controlled.

To carry out work on a plant device 6, 8, by way of example on the drive, using for example a maintenance engineer, the maintenance engineer contacts, by way of example, a plant engineer in the industrial plant 2 and requests isolation of the plant device 8 that is to be maintained. The plant engineer then undertakes a number of safety measures on the plant device 8, such as switching off the power supply to the drive and a mechanical blockade of moving parts, to ensure a high level of safety when working on the drive. The safety measures are documented on a form and once the safety measures are complete the plant engineer gives a copy of the form to the maintenance engineer as confirmation of isolation. Handing over the confirmation of isolation, and therewith the permission to carry out work on the plant device 8, constitutes the process of isolation of the plant device 8 in this case.

In addition to this isolation the plant engineer makes use of a data communication unit 28 in the faun of a portable component that he carries with him, and reads in an identification code pertaining to the plant device 8 and the switching station 12. For this purpose storage mediums 30 in the form of bar codes are provided on the plant devices 6, 8 and the switching station 12, on which data relating to the identification of the plant devices 6, 8 and/or the switching station 12 is written. This data is read with the aid of a data input 32 of the data communication unit 28, which in this exemplary embodiment is a barcode reader. The identification data is wirelessly transmitted via a transmitter 34 in the data communication unit 28 to an interface unit 36 of the server 20, so the server, and therewith the control and protection system 26, know that the plant device 8 and a corresponding portion in the switching station 12 are isolated. Transmitter 34 and interface unit 36 form an interface, it being possible for the transmitter 34 to also be used as a receiver to receive data which is sent for example from the interface unit 36.

This isolation information is expediently communicated to the control and protection system 26 before safety measures are begun because the control and protection system 26 blocks automatic triggering of the plant device 8 immediately after the isolation information has been processed by the server 20. The plant engineer is consequently already protected against undesirable triggering of the plant device 8 as the safety measures are being undertaken. The server 20 acknowledges receipt of the isolation information and this acknowledgement is visually displayed on a display 38 of the data communication unit, so the plant engineer knows that transmission of the isolation information to the control and protection system 26 was successful.

Prompted by the isolation information, the operator stations 22 are accordingly provided with a corresponding indication 40 to the effect that the plant device 8 is isolated. Isolation is also logged by the control and protection system 26, namely the identification of the plant device 8 and an identification of the data communication unit 28, which sends its own identification code to the server 20, and the time of transmission of the isolation information for this purpose.

As a next step the server 20 performs a plausibility test and in the course thereof checks whether information exists as to whether the plant device 8 has been switched off or is otherwise idle. As data was communicated before the safety measures were undertaken, i.e. before the drive 8 was switched off, no such information is available and the result of the plausibility test is negative. As a consequence, with indication 40, it is output on the display 24 that the plant device 8 is isolated but still in operation. This indication is also communicated to the data communication unit 28 and shown on display 38. Once the plant device 8 has been switched off the plausibility test, which is carried out at regular intervals, for example every five seconds, is positive and the corresponding information is removed from or amended on the displays 38.

By way of an input 42 in the form of a keyboard it is possible for the plant engineer to input data relating to the extent and type of work to be carried out on the plant device 8 and this is also transmitted to the server 20 on a send command from the plant engineer. This information is also shown in indication 40 or can be shown at the request of an operator in the control room 18. The operator accordingly knows how long the disruption is likely to last and what risks are associated with it.

The server 20 also determines status data relating to the plant device 8, such as speed of the drive, temperature and current consumption or output, as information for the plant engineer. Information on the consequences of isolation or on additional measures relating to isolation is also communicated, for example that it is inappropriate to switch off the drive within the next 15 seconds as the drive should be shut down in a more regulated manner. The additional measure is a waiting period of at least 15 seconds. The plant engineer accordingly waits for 15 seconds until he switches off the drive, or until a corresponding release is given by the control and protection system 26 or server 20.

In response to communication of release information to the server, the server also checks which switch-off measures should advantageously be carried out by the control and protection system 26. Such an advantageous switch-off measure is, for example, regulated shutdown of the drive. The measure, including the anticipated duration thereof—15 seconds in the above example—, is communicated to the data communication unit 28 and shown on the display 38. The execution of such a switch-off measure is also communicated to operator stations 22 in the control room 18 for an operator's information.

Following the implemented switch-off measure, the safety measures and isolation, the maintenance engineer can carry out the desired work on the plant device 8.

Once it is finished it may be necessary to test the plant device, so the maintenance engineer sometimes supplies the plant device, which is still isolated, with working energy by restoring the power supply to the plant device. A mechanical obstruction might be removed and an operating test carried out. Partial or complete operational readiness is communicated to the server by the switching station 12 and the automation system 10 and displayed at the operator stations. Activating triggering of the plant device 8 continues to be blocked, however, as it is still isolated. The operating test can be carried out without the control and protection system triggering the drive to take up regular operation.

Once the safety measures have been reversed, the plant engineer cancels isolation in that he reads-in the storage medium 30 of the plant device 8 again and sends corresponding isolation information via interface 36 to the control and protection system 26. Isolation is cancelled and the plant device 8 is released for regular operation.

For a first start-up or start-up following a relatively major repair or maintenance it is advantageous for the control and protection system 26 to be constructed to send data to the data communication unit 28 that relates to the plant device 8 which has been put into service, for example status data such as temperature, current consumption and speed. A maintenance or plant engineer can thus determine whether start-up has been successful without requiring a corresponding partner in the control room 18 to communicate this necessary start-up information. To request this start-up information the data communication unit 28, in response to a request via the keyboard 42, sends a corresponding request to the server 20 which, in response, sends the corresponding data, again wirelessly, to the data communication unit 28.

Work can be carried out on the plant device 8 and the plant device 8 can be effectively and safely started up in the described manner.

The invention claimed is:

1. A method for isolating a plant device of an industrial plant wherein a safety measure is implemented on the plant device in order to work safely on the isolated plant device, comprising:
   communicating isolation information comprising a first data to a control and protection system of the industrial plant using a data communication unit,
   wherein the data communication unit includes a data input device for receiving the first data from the plant device that identifies the plant device,
   wherein an interface exists between the data communication unit and the control and protection system; and
   wherein the first data is input into the data communication unit at the site of the plant device, and an operator communicates the isolation information to the control and protection system via the data communication unit via the interface, and the control and protection system isolates the plant device in response to receiving the isolation information from the data communication unit, and the control and protection system blocks automatic triggering of the plant device as part of the isolation;
   wherein the data communication unit is a portable unit which is brought to the plant device by the operator to receive the first data from the plant device that is to be worked on.

2. The method as claimed in claim 1, wherein the plant device is provided with a storage medium comprising a second data, which is read-in by the data communication unit.

3. The method as claimed in claim 1, wherein the isolation information includes a third data on the work to be carried out on the isolated plant device.

4. The method as claimed in claim 1, wherein the triggering is also blocked when the isolated plant device is supplied and switched on with working energy.

5. The method as claimed in claim 1, wherein the control and protection system identifies the isolated plant device on a display.

6. The method as claimed in claim 1, wherein the control and protection system logs a plurality of isolations of a plurality of plant devices.

7. The method as claimed in claim 1, wherein the control and protection system carries out a plausibility test on the isolated plant device to determine whether further information, other than isolation information, exists for the isolated plant device, and whether the further information is compatible with an isolation.

8. The method as claimed in claim 7, wherein the control and protection system emits a warning to the data communication unit in a case of a negative test result on the plausibility test.

9. The method as claimed in claim 1, wherein the control and protection system determines a fourth data relating to the isolated plant device and sends it to the data communication unit.

10. The method as claimed in claim 9,
    wherein the isolated plant device is put back into operation and,
    wherein at the request of the data communication unit, the control and protection system determines a fifth data relating to the plant device that has been put back into operation and sends it to the data communication unit.

11. The method as claimed in claim 1, wherein the control and protection system determines a plurality of consequences of the isolation within the industrial plant and sends a sixth data relating to the plurality of consequences to the data communication unit.

12. The method as claimed in claim 1, wherein a cancelation of isolation is communicated to the control and protection system by the data communication unit.

13. The method as claimed in claim 1, wherein the operator initiates the communication of the isolation information from the data communication unit to the control and protection system in conjunction with manually isolating the plant device, which includes switching it off.

14. The method as claimed in claim 1, wherein the operator uses the data communication unit to read the first data from a barcode or radio frequency identification device attached to the plant device, and initiates the communication of the isolation information from the data communication unit to the control and protection system via operator input into the data communication unit.

15. A device for isolating a plant device of an industrial plant so that work may be carried out on the plant device, comprising:
    a data communication unit having a data input for receiving a first data from the plant device that identifies the plant device;
    a control and protection system of the industrial plant; and
    an interface for connecting the data communication unit in terms of signaling to the control and protection system,
    wherein the interface transmits isolation information comprising the first data from the data communication unit to the control and protection system;
    wherein the first data is input into the data communication unit at the site of the plant device that identifies the plant device, and the data communications unit enables an operator to transmit the isolation information to the control and protection system via the data communication unit, and the control and protection system isolates the plant device in response to receiving the isolation information from the data communication unit, and the control and protection system blocks automatic triggering of the plant device as part of the isolation;

wherein the data communication unit is a portable unit which is brought to the plant device by the operator to receive the first data from the plant device that is to be worked on.

16. The device as claimed in claim 15, wherein the plant device is provided with a storage medium comprising a second data, which is read-in by the data communication unit.

17. The device as claimed in claim 15, wherein the isolation information includes a third data on the work to be carried out on the isolated plant device.

18. The device as claimed in claim 15, wherein the triggering is also blocked when the isolated plant device is supplied and switched on with working energy.

* * * * *